Sept. 22, 1959 T. BARDEEN 2,905,772
AUTOMATIC VOLUME CONTROL SYSTEMS FOR SEISMOGRAPH AMPLIFIERS
Filed Nov. 14, 1955 3 Sheets-Sheet 1

INVENTOR.
Thomas Bardeen
BY
ATTORNEY

Fig. 2.

INVENTOR.
Thomas Bardeen.

Sept. 22, 1959 T. BARDEEN 2,905,772
AUTOMATIC VOLUME CONTROL SYSTEMS FOR SEISMOGRAPH AMPLIFIERS
Filed Nov. 14, 1955 3 Sheets-Sheet 3

Fig. 3.

INVENTOR.
Thomas Bardeen.
BY
ATTORNEY

United States Patent Office 2,905,772
Patented Sept. 22, 1959

2,905,772
AUTOMATIC VOLUME CONTROL SYSTEMS FOR SEISMOGRAPH AMPLIFIERS

Thomas Bardeen, Fox Chapel, Pa., assignor to Gulf Research & Development Company, Pittsburgh, Pa., a corporation of Delaware Application November 14, 1955, Serial No. 546,705

11 Claims. (Cl. 179—171)

This invention relates to improved automatic volume control systems for audio amplifiers, and in particular concerns AVC systems which are advantageous when used in multi-channel seismic prospecting apparatus.

In seismograph prospecting, a charge of explosive is fired so as to produce earth tremors which are observed at a plurality of points spaced from the explosive source of earth vibration. The seismic wave from the exploding charge spreads through the earth in all directions as a pulse of wave energy. Part of the wave energy passes through the earth close to the surface of the earth, and reaches observing positions by a more or less direct path. This wave is ordinarily the first to reach the observing position. Part of the wave energy penetrates downward into the earth and is reflected and refracted from the underground strata, interfaces, fault planes, etc. and reaches the observing position by indirect paths. The pulses received at the observing position are converted into electrical energy by a geophone and the electrical energy is amplified and recorded for subsequent analysis and interpretation. The effect observed is first a rather sudden violent vibration, corresponding to the first arrival, followed by a series of energy pulses of generally decreasing amplitude. Some of these later vibrations are stronger than others, according to varying attenuation of waves which have been reflected or refracted upward from various subterranean strata. The various pulses are observed over a time interval of a few seconds and each individual pulse may comprise three or four oscillations. All this is well known in the art.

In present day seismograph prospecting practice, the received pulses are detected by geophones which produce a fluctuating electrical signal corresponding to the earth tremors and the electrical signal is amplified by a vacuum tube amplifier whose output signal is commonly recorded as a wiggly trace on a record medium by an oscillograph. The excursions of this trace are determined by the amplification or gain factor of the amplifier. The amplification, also called "gain" or "volume," may be adjusted in part by the operator, but may also be automatically controlled either progressively with time or as a function of the amplifier signal. The former devices are called expanders, and the latter devices are termed automatic volume control devices or simply AVC systems. This invention is concerned with improvements in such AVC systems for seismograph prospecting amplifiers.

It is well known that automatic volume control is desirable in seismograph prospecting amplifiers in order to keep the excursions of the galvanometer on the recording medium and avoid loss of parts of the trace. It is also well known to arrange an amplifier so that its gain is automatically reduced when the signal level is strong and restored to normal when the signal level is weak. It is also known to provide each amplifying channel with its own automatic volume control device whose function is to automatically control the amplifier gain so that the output remains within reasonable bounds. Such amplifiers usually embody means for taking off a portion of the signal energy either from the input or the output of the amplifier, and causing this energy to either bias a tube in the amplifier to reduce its gain, or to control a shunting circuit which reduces signal transfer in some part of the amplifier. Generally the system takes a part of the amplifier output, sometimes adds further amplification, rectifies and smoothes this signal in order to obtain a substantially D.-C. control signal, which may be applied to one or more stages of the same amplifier in order to control the amplification thereof. However, all devices of this type require a certain amount of filtering before the AVC energy can be used for control purposes and such filtering always has a certain inherent time constant which manifests itself as a delay in the control action. As a result of this delay the AVC systems heretofore in use have been far from perfect and leave much to be desired. It is also well recognized that all such systems require for their operation a small error voltage since their operation depends on a slight increase in the general level of output signal to generate the control voltage.

The behavior and the efficacy of any AVC system is largely determined by its time constant. In order to quickly reduce the gain upon arrival of the first strong pulses, a short attack time is desirable. However, the AVC should also be able to control the gain of the amplifier after the first arrival and this requires a long time constant. Furthermore, overloading with attendant distortion or even actual blocking of the amplifier is to be avoided. This invention provides an improved form of AVC which eliminates blocking and which has desirable time constant characteristics.

The number of seismograph recording channels has steadily increased over the years and it is now common to use twenty-four or more separate channels. Inasmuch as the AVC generating apparatus is repeated in each channel this represents a considerable amount of duplicate equipment, all of which represents considerable weight and requires power for its operation. It has been proposed to operate the AVC from a master control which samples the output from one of the channels and generates the necessary signal for simultaneously controlling all of the channels of the system. The prior apparatus employed in these master AVC systems has simply been a copy of the AVC of a single channel. There are however certain disadvantages inherent in this type of AVC system, one of the most important of which is that feedback may occur which renders the amplifier unstable and this instability becomes all the more aggravated when a large number of channels are involved. Furthermore, the heretofore used AVC systems require heavy equipment to develop the necessary control power. The present invention concerns an AVC system employing both a master AVC and an individual AVC which is highly efficient and which avoids the possibility of oscillation due to feedback and which is small and light in weight. In addition to desirable time constant characteristics this invention provides means for obtaining a substantially flat average output for all values of input signal encountered in seismic prospecting.

It is an object of this invention to provide a master AVC system which is highly efficient, light in weight, and which avoids difficulties of feedback in the amplifying system.

It is a further object of this invention to provide an improved AVC system which is effective in its control of events of long duration and of events of short duration.

It is a further object of this invention to provide an improved AVC system which achieves a substantially flat average amplifier output over all ranges of seismic input signal.

It is a further object of this invention to provide an AVC system which is substantially instantaneous in effecting a substantially logarithmic AVC for high amplitude events, and which achieves substantially flat average amplifier output for medium amplitude events.

These and other useful objects of this invention are accomplished as described in this specification, of which the drawings form a part, and in which.

The preferred embodiment of this invention employs in combination a master AVC channel whose output is rectified, filtered, and applied to an impedance bridge to control a high-frequency signal from an independent oscillator, which frequency is amplified, rectified, filtered with a long time constant and used to control all amplifier channels as well as itself, and also employs in each channel either an individual AVC of short time constant actuated independently of the channel output or an individual instantaneous AVC which results in a channel output in proportion to the logarithm of channel signal.

Figure 1:
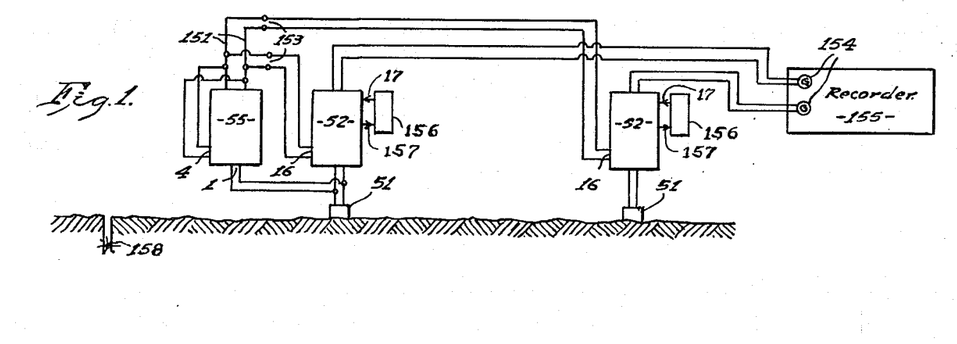
Figure 1 shows a block diagram of a master AVC system employed in this invention.

A typical multi-channel seismograph prospecting apparatus is illustrated in Figure 1. A seismograph shot 158, at or near the surface of the ground, forms a source of seismic disturbance and the earth tremors are picked up and converted to electrical signals by one or more geophones 51 which are each connected respectively to one of a group of amplifiers 52 each of whose output is in turn respectively connected to one of a number of galvanometers 154 in a recorder device 155. Only two channels, each comprising a geophone 51, an amplifier 52, and a galvanometer 154 are shown in Figure 1, but it is common practice in present-day seismograph prospecting operations to use a large number of such channels, twenty-four being a commonly employed number.

Each amplifier 52 has two points in its channel where an external voltage may be applied to control its amplification. One of these comprises the pair of terminals 16 to which an external D.-C. voltage is applied to control the amplification of the early stage or stages of the amplifier 52. The other comprises a terminal 17 to which (together with ground) another D.-C. voltage is applied to control the amplification of one or more stages of the amplifier succeeding those to which the control terminals 16 apply. The two controls 16 and 17 thus operate in cascade.

The D.-C. control voltage applied to terminals 16 is obtained from a master AVC unit 55 whose input 1 is connected in parallel with the input to one of the amplifiers 52. It is preferred to use that channel whose detector is located closest to the shot point 158. Switching arrangements may be provided to switch the input 1 from one end of the detector spread to the other when shooting from opposite ends of the detector spread as is often done.

The AVC amplifier 55 itself has means for controlling its own amplification and for this purpose is provided with terminals 4. The circuit of amplifier 55 will be described in detail later by reference to Figure 4. Its D.-C. control voltage output is delivered at leads 151 and these are connected to the amplifier-control terminals 16 of the amplifiers 52, and also to the control terminals 4 of the AVC amplifier 55. By means of the circuit shown in Figure 1, the amplifier 55 controls the amplification of each of the separate channels 52 and at the same time also controls its own amplification.

The D.-C. control voltage applied to terminal 17 is obtained from an individual AVC unit 156, each amplifier being provided with a unit 156. Each individual AVC unit 156 derives its input from its amplifier channel at a point 157 which is intermediate between the last point where control from terminals 16 applies and the first point where control from terminal 17 applies. Inasmuch as the point of control 17 for the individual AVC 156 is forward of the point 157 from which it derives its input it is apparent that the individual AVC 156 is of the forward-acting type. Whereas the master AVC 55 returns its control to itself (at terminals 4) as well as to the amplifier channels 52 (at terminals 16), each individual AVC unit 156 does not control itself but controls only its associated amplifier. In Figure 1, the arrows on the two lines 157 and 17 show the signal flow and only one line is used because each individual AVC unit 156 is most conveniently incorporated into the chassis of its amplifier 52 so that the units 156 and 52 carry a common ground. The individual AVC units 156 operate with a short time constant. Details of each of the AVC circuits will be described later.

By means of the above outlined combination, this invention provides for a long-time-constant master AVC which is followed in cascade in each channel by a short-time-constant individual AVC. This combination achieves a complete degree of control not heretofore attainable. By means of this system it has been found possible to maintain a substantially flat general average of output signal within the large range of input signals to which the system is subjected in seismograph prospecting operations. It is preferred that the long-time-constant AVC of the master control amplifier 55 have a time constant that is considerably longer than the duration of a seismic pulse, and a time constant of from one to two seconds has been found desirable. It is preferred that the short time constant of the individual AVC's have a time constant that is about the same as the duration of a seismic impulse and a time constant of from .05 to .3 second has been found desirable. A substantially flat general level of output signal is obtained by cascading the short-time-constant individual AVC after the long-time-constant master AVC according to this invention.

Figure 2:
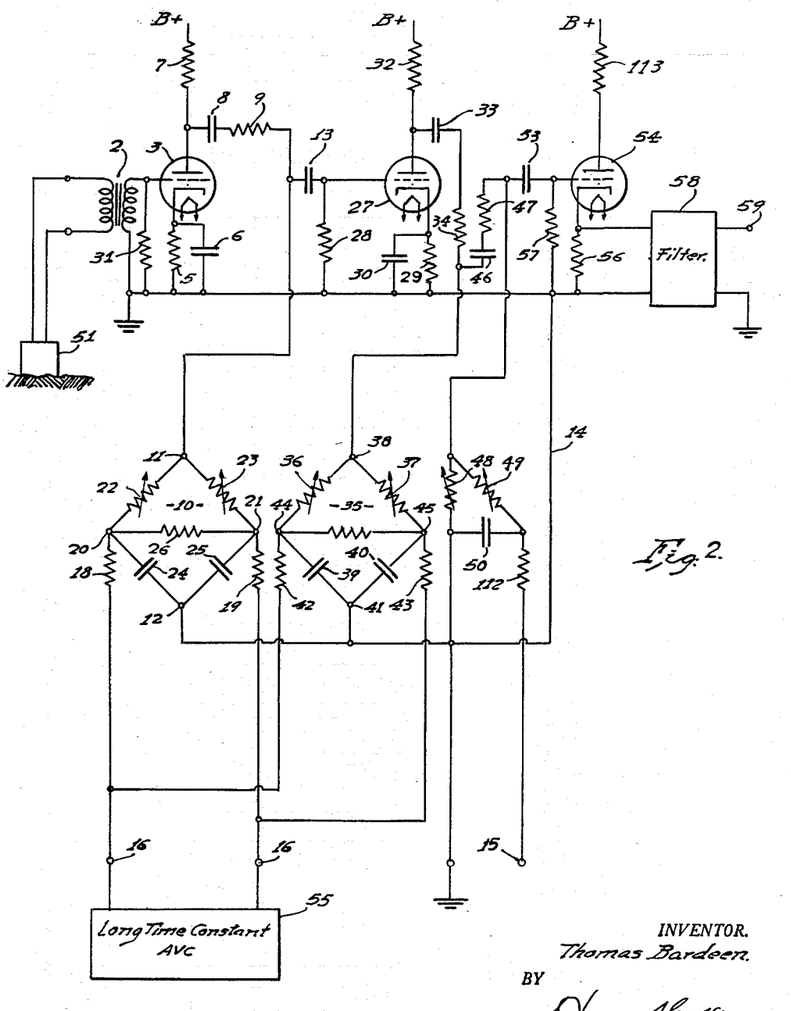
Figure 2 shows a schematic wiring diagram of the first two stages of a seismograph amplifier channel embodying this invention.

The details of each seismic channel amplifier 52 of Figure 1 will now be described by reference to Figure 2, which shows a schematic wiring diagram of a seismograph amplifier whose input transformer 2 is connected by means of the customary cable to a geophone or seismic detector 51. Instead of a single detector shown, multiple detectors may be used as is well known in the seismograph prospecting art. The secondary winding of transformer 2 is connected to the grid of a triode 3 and may be shunted by a load resistor 31. The cathode of tube 3 is returned to ground through customary cathode resistor 5 and bypass condenser 6. The plate of the triode 3 is supplied from a source of plate voltage through plate resistor 7, and is coupled to the succeeding stage through coupling condenser 8 and a voltage divider circuit comprising resistor 9 and a balanced impedance bridge 10, bridge terminals 11 and 12 (which returns to ground via lead 14) being connected in series with the resistor 9. The bridge 10 is of a particular type which will be described in detail later. The voltage divider is connected so that the signal passed on from tube 3 to the succeeding stage through condenser 13 will depend on the bridge impedance between terminals 11 and 12 as compared with the impedance of resistor 9, the condenser 8 being of relatively large capacity. The impedance of bridge 10 is controllable by the D.-C. voltage applied between terminals 16 from an AVC source 55.

For the purpose of this invention the AVC source 55 has a long time constant as previously mentioned and is free from seismic signal. It comprises a master AVC source which is connected to and acts on all of the amplifier channels of the recording apparatus used. It receives its energy from the signal of one of the amplifier channels and supplies a voltage varying as a function of input signal. Voltage from the AVC source 55 is supplied to amplifier terminals 16 and fed through resistors 18 and 19 to opposite points 20 and 21 of the bridge 10. The bridge 10 itself comprises a pair of similar resistors 22 and 23 in adjacent arms of the bridge and a pair of similar condensers 24 and 25 in the other arms of the bridge. The bridge 10 is balanced at all times. The resistors 22 and 23 are each nonlinear, voltage-sensitive resistors. Such resistors are available under a variety of trade names, e.g., "Varistor" made by International Resistance Company, "Thyrite" made by General Electric Company, and "Globar" type BNR made by the Carborundum Company. These devices are nonlinear resistors having a large negative resistance-voltage coefficient, so that when the voltage applied to the terminals of the device increases the resistance decreases. In the bridge 10 the control voltage from the AVC source 55 is applied to resistors 22 and 23 in series, and as this control voltage increases the resistance between points 20 and 21 decreases. The condensers 24 and 25 serve to maintain the A.-C. balance of the bridge and return the A.-C. signal from points 20 and 21 to ground at point 12 via lead 14. Resistors 18 and 19 in combination with condensers 24 and 25 serve to decouple the bridge 10 and a succeeding bridge 35 from each other. The resistor 26 serves as an upper limit to the resistance between points 20 and 21 in order that the condensers 24 and 25 may discharge within a reasonable time subsequent to AVC action. It is apparent that the operation of bridge 10 is such that when a D.-C. voltage is applied to it from the AVC source 55 the impedance between points 11 and 12 decreases and the signal transmitted from tube 3 to the succeeding stage also decreases.

The controlled signal is transmitted through condenser 13 to the grid of tube 27, a grid resistor 28, cathode resistor 29 and bypass condenser 30 being connected in the customary manner as shown. The plate of tube 27 is supplied with voltage through the plate resistor 32 and its signal is passed on to the next stage through coupling condenser 33 and a voltage divider comprising resistor 34 and a balanced impedance bridge 35. The bridge 35 is similar to the bridge 10 and comprises similar non-linear voltage-sensitive resistors 36 and 37 connected to the point 38 as shown, and a pair of similar condensers 39 and 40 in the other arms connected to point 41 as shown. The bridge 35 is balanced at all times. Control voltage from the AVC source 55 is supplied to the amplifier terminals 16 and thence to points 44 and 45 of bridge 35 through resistors 42 and 43 in the same manner as in the case of bridge 10. Resistors 42 and 43 in combination with condensers 39 and 40 serve to decouple the bridges 10 and 35 from each other. The impedance between the points 38 and 41 of bridge 35 depends on the D.-C. voltage applied to points 44 and 45 from the AVC source 55. Therefore the signal of tube 27 which is passed on to the next stage depends on the control signal from AVC source 55.

The bridges 10 and 35 containing nonlinear resistors 22 and 23, 36 and 37 respectively, introduce no observable distortion into the A.-C. signal because the A.-C. signal applied to them is so small that as far as the A.-C. signal swing is concerned the resistors are practically constant. The A.-C. signal is of the order of millivolts, whereas it requires something of the order of volts to effect an appreciable change in the resistance of the nonlinear resistors. The much higher D.-C. control voltage from the AVC source 55 is of course of sufficiently high voltage to effect a change in the resistance of the non-linear resistors.

The signal, further controlled as explained above, is passed on through condenser 46 and a voltage divider comprising resistor 47 and the network comprising resistors 48, 49, and condenser 50. The impedance of the latter network is controlled by the voltage applied between terminal 15 and ground through resistor 112 to the junction of the condenser 50 and resistor 49 and returning to ground as shown. The voltage applied to terminal 15 has the purpose of providing an overall gain control for the amplifier and it is used by the operator to manually set the zero signal amplification level of the amplifier channel. The resistors 48 and 49 are nonlinear voltage-sensitive devices whose resistances control the overall amplifier gain. By applying an external D.-C. voltage to the point 15 the operator controls the impedance of the network 48, 49, 50 and in this manner can control the zero signal amplification of the amplifier channel. Resistor 112 in combination with condenser 50 serves to decouple the manual gain controlling circuit of this amplifier from that of other amplifiers when they are all controlled from a common manual control. Whereas a non-linear bridge type of controlling element is preferred for controlling the amplification of tubes 3 and 27, it is within the purview of this invention to use any known type of control element by means of which the amplification can be controlled through the application of external voltage.

The signal is then transmitted through coupling condenser 53 to the grid of tube 54. The plate of tube 54 is supplied plate voltage through resistor 113. The tube 54 is shown operating as a cathode-follower stage with cathode resistor 56. The tube also has a customary grid resistor 57. The output signal of tube 54 appears across cathode resistor 56 and is transmitted through a filter 58 to the next stage which connects to terminal 59 and continues on Figure 3. It is customary in seismograph amplifying channels to employ one or more filter networks such as 58, and whereas there is shown a cathode follower stage preceding the filter this is only for purposes of impedance matching and a conventional amplifier stage with or without filter may be substituted in place of tube 54 and filter 58 if desired.

Figure 3:
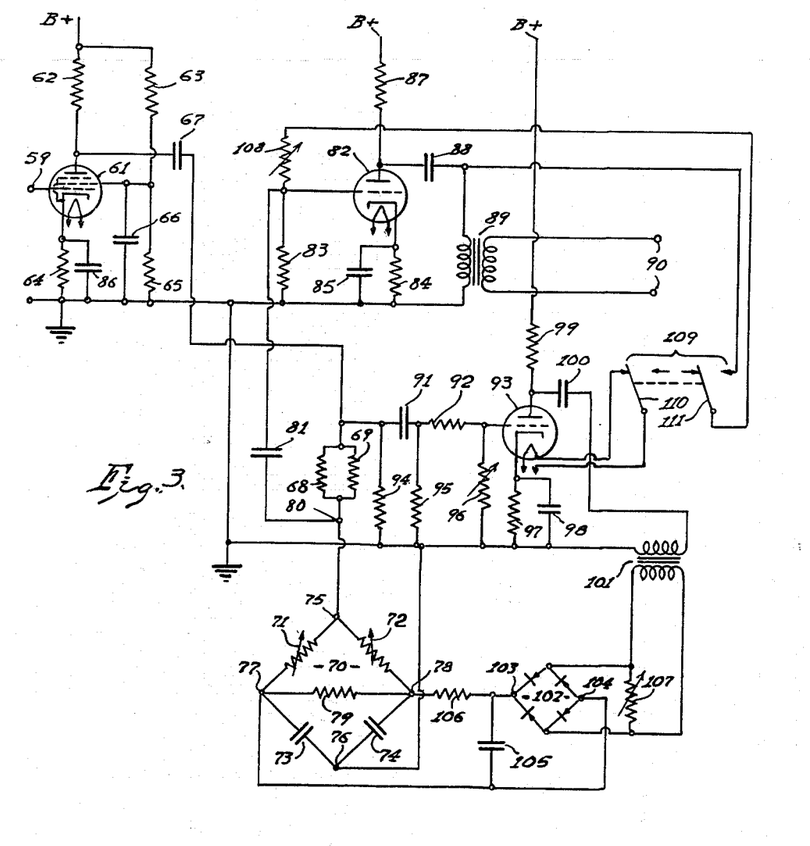
Figure 3 shows a schematic wiring diagram of the later stages of the seismograph amplifier of Figure 1 and which embodies this invention.

Continuing with Figure 3, the signal from filter delivered at terminal 59 goes to the grid of tube 61. The filter 58 (Figure 2) contains a resistor which serves as grid resistor for the tube 61 and the filter 58 will also contain a condenser which serves to transmit signal but otherwise isolates the grid circuit of tube 61 from the circuit of preceding tube 54. Tube 61 is shown as a pentode whose plate is supplied through resistor 62 and whose screen voltage is obtained from a voltage divider comprising resistors 63 and 65, the latter having bypass condenser 66. Tube 61 also has conventional cathode resistor 64 with bypass condenser 86. The signal from the plate of tube 61 is transferred to the succeeding stage through coupling condenser 67.

The signal after passing through coupling condenser 67 is applied to a voltage divider circuit comprising parallel resistors 68 and 69, and a balanced impedance bridge circuit 70. (The parallel resistors 68 and 69 act as a single resistor and the reason for the parallel circuit will be explained later.) The bridge 70 comprises a pair of similar nonlinear voltage-sensitive resistors 71 and 72 in adjacent arms and a pair of similar condensers 73 and 74 in the other arms. The bridge 70 is balanced at all times. The impedance of the bridge between points 75 and 76 is controllable in a manner similar to that described for bridges 10 and 35 of Figure 2, namely by controlling the voltage across points 77 and 78. Resistor 79 is provided to assure discharge of the condensers 73 and 74 at low level operation. The manner of controlling the voltage across points 77 and 78 will be described later.

Signal from point 80 of the voltage divider is transferred through coupling condenser 81 to the grid of tube 82 which also has grid resistor 83 and conventional cathode resistor 84 with bypass condenser 85. The plate of tube 82 is supplied through the plate resistor 87 and the output signal passes through coupling condenser 88 and output transformer 89 to the output terminals 90 of the amplifying channel. The output terminals 90 are connected to one of the recording galvanometers in customary manner.

The signal for the output stage (tube 82) is controlled by an individual AVC system of the forward-acting type. For this purpose the signal from the output from the condenser 67 of the preceding stage (tube 61) is amplified, rectified and filtered, and the resulting D.-C. is used to control the voltage divider 70 which in turn controls the signal input to the output stage (tube 82). The signal which passes through condenser 67 is transmitted by a coupling condenser 91 and resistor 92 to the grid of a tube 93. This circuit also contains resistor 94 whose purpose is to insure proper balance of the previously-mentioned voltage divider to ground. Resistor 95 serves as a limiting impedance for the grid circuit of tube 93. In order to prevent blocking of the tube 93 for excessively high signals a resistor 96 may be placed in the circuit, this resistor being of the nonlinear voltage-sensitive type so that for excessively high signals its impedance becomes low and together with resistor 92 it prevents excessive voltages from appearing on the grid of tube 93. Tube 93 is provided with conventional cathode resistor 97 and bypass condenser 98 and is fed plate voltage through resistor 99 as shown. The signal from tube 93 passes through coupling condenser 100 and transformer 101 whose secondary output is rectified by full-wave rectifier 102. The ripple in the pulsating D.-C. delivered at terminals 103 and 104 is smoothed by means of a filter comprising condenser 105 and resistor 106 and the resulting voltage is applied to the bridge 70 at points 77 and 78. Inasmuch as the bridge 70 is always balanced, any ripple remaining in the voltage applied to points 77 and 78 will not appear at points 75 and 76 and hence will not be fed back into the signal entering either tube 82 or tube 93. The AVC network comprising tube 93, rectifier 102, and bridge 70 is of the forward-acting type and may be made to give a substantially flat output at the point 80 over a reasonable range of input signal. It may in fact be made to overcontrol, and this condition is avoided by connecting a nonlinear voltage-sensitive resistor 107 across the output of transformer 101. It is seen that nonlinear voltage-sensitive resistor 96 in combination with fixed resistor 92 in the input circuit of tube 93, and nonlinear voltage-sensitive resistor 107 in the output circuit of tube 93, both serve to control the action of tube 93. It has been found that if a nonlinear resistor is selected which has a very high degree of voltage sensitivity, then it is not necessary to use such a resistor in both places 96 and 107 and either one alone will suffice. It should be noted that the tube 93 is itself not controlled by the AVC voltage which it generates, and the necessary regulation of tube 93 is effected by nonlinear resistor 96 or 107 or both. As a further aid in achieving a flat AVC action at the point 80, the parallel resistors 68 and 69 are selected in such manner that together with the particular nonlinear voltage-sensitive resistors 71 and 72 used in bridge 70, they will together result in attainment of substantially flat AVC action over a reasonable range of input signal. By restricting the range of control, this control may be made as fast acting as is desired consistent with the recording of seismic impulses.

The time constant of the AVC system comprising tube 93, rectifier 102 and bridge 70 is determined by the capacitors 73, 74, 105 and resistors 79 and 106, and at high control voltages also resistors 71 and 72. Inasmuch as the necessity for perfect filtering is eliminated by the balanced bridge network 70, this time constant may be made quite small so that the AVC system will be fast acting. A time constant of from 0.05 to 0.3 seconds has been advantageous. In this manner, with each channel of the seismograph system equipped with an individual AVC of the type shown, each channel will have a fast-acting (short-time-constant) AVC which maintains substantially level average output signal over a reasonable range.

The short-time constant individual AVC described above has an upper limit of input signal beyond which it no longer is able to maintain flat control. This attribute is inherent in such a system acting alone. However, in the present invention, the signal entering the tubes 82 and 93 is already under control of the long-time-constant master AVC operating on tubes 3 and 27 of Figure 2. The long-time-constant master AVC 55 keeps the signal within the flat range of the short-time-constant individual AVC. Accordingly, by their combined action a substantially flat average level of output signal is obtained at terminals 90. This result cannot be achieved by a long-time-constant AVC acting alone because of its slow action. However, in the present invention the two types of AVC cooperate to effect a level average output throughout the entire seismograph record.

In certain instances it has been found desirable to employ an instantaneous type of AVC as an alternative to the above-described fast-acting AVC. This is accomplished by applying nonlinear signal-sensitive feedback across tube 82. Such feedback is provided by resistor 108 connected from the output side of condenser 88 to the junction of resistor 83 and condenser 81 in the grid circuit of tube 82 as shown. The resistor 108 is of the nonlinear voltage-sensitive type similar to the resistors used in the bridges 10, 35, and 70. The resistor 108 provides negative feedback from the output of tube 82 to the input of this tube and the degree of feedback depends on the resistance of resistor 108, which in turn depends on the signal level. It has been found that a non-linear voltage-sensitive resistor of the type described, when connected as the resistor 108, provides a substantially logarithmic output signal control, that is, the output signal from tube 82 will be substantially proportional to the logarithm of the input signal to tube 82. As the output signal increases, the voltage across the voltage divider comprising resistors 108 and 83 increases, the resistance of 108 decreases, and the percentage feedback increases. Inasmuch as the feedback is out of phase, it acts to decrease the gain factor of tube 82. A substantially logarithmic relationship between output and input is obtained. This is advantageous in that it provides instantaneous AVC action, but leaves sufficient variation in output level so that reflection pulses may be identified within the general level of the output signal.

In order to provide alternative operation of the fast-time-constant individual AVC or the instantaneous logarithmic individual AVC a double-pole double-throw switch 109 is provided. One half of the switch 110 is connected so as to open the filament circuit of tube 93 when it is desired to use the instantaneous logarithmic individual AVC. The other switch 111 is connected so as to open the circuit of resistor 108 when it is desired to use the short-time-constant individual AVC. As shown in Figure 3 the switch is in position so that the short-time-constant individual AVC will operate. The two switches 110 and 111 are mechanically connected and if desired may be relay operated for special operations.

Figure 4:
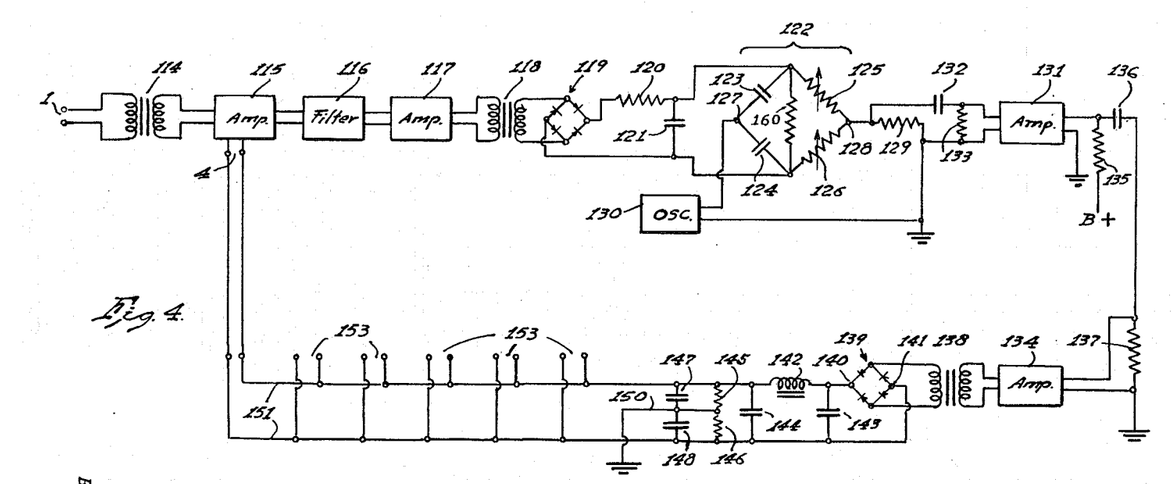
Figure 4 shows a schematic wiring diagram of a master AVC channel employed in this invention.

Referring now to Figure 4 which is a schematic wiring diagram of the AVC amplifier 55 of Figure 1, the input of the amplifier 55 is fed to terminals 1 in parallel with the input of any one of the regular amplifying channels, preferably that channel whose seismic impulse arrives first as previously mentioned. The signal is coupled by means of transformer 114 to amplifier 115 which may comprise one or more stages as is customary in seismograph amplifiers. The amplifier 115 is provided with terminals 4 to which a signal may be applied which controls the amplification or gain of amplifier 115. The amplifier 115 may comprise one or more stages and may be similar to corresponding stages of the regular amplifying channels each of which has corresponding terminals (16 of Figures 1 and 2) so that the gain of the channel may be controlled. In amplifier 115 any known type of amplification control may be used which is actuated by application of control voltage to terminals 4, one of which may be grounded if required, but it is preferred to use the same type of control as that shown in Figure 2 and used in each seismic amplifier 52.

The output of amplifier 115 is passed through a frequency filter 116 usually of the band-pass type as is customary in seismograph amplifiers. The filter 116 may form an interstage coupling unit between amplifier 115 and amplifier 117 between which it is connected and the filter 116 preferably has the same frequency characteristic as the filter 58 (Figure 1) of the seismic channels. The units 114, 115, 116 and 117 may be similar to those of the seismic amplifying channel 52 of Figure 1. Thus the units 114, 115, 116, and 117 may be similar to the equipment of Figure 1 and Figure 2 as far as the coupling condenser 67. It is preferred to insert an additional stage of amplification after the condenser 67 so that the amplifier 117 comprises two stages whose output is delivered to the primary of a transformer 118.

The output of the amplifier 117 is used for the purpose of generating AVC signal and is connected to a transformer 118 whose output is rectified by means of a full-wave rectifier 119 and a smoothing filter comprising resistor 120 and condenser 121. There is provided across the terminals of condenser 121 a substantially D.-C. control voltage which is fed to one diagonal of a balanced impedance bridge circuit 122 of a particular type. A residual ripple in the D.-C. voltage across condenser 121 is not detrimental to the successful operation of the invention.

The bridge 122 comprises similar nonlinear resistors 125 and 126 and similar condensers 123 and 124 with the capacities and resistances so balanced that an A.-C. voltage across the opposite diagonal, namely, across points 127 and 128 is always balanced. Alternatively the elements 123 and 124 of the bridge 122 may be nonlinear resistors similar to 125 and 126 of such value that the bridge is always balanced. Fixed resistors may also be used as elements 123 and 124, but this is less advantageous because of the unnecessary power lost therein. A resistor 160 is provided across the input terminals of the bridge 122 in order to discharge condenser 121 at low signal levels.

In the bridge 122 the resistors 125 and 126 are of the previously-mentioned type whose resistance varies nonlinearly with applied voltage, these devices being nonlinear voltage sensitive resistors having a large negative resistance-voltage coefficient, so that when the voltage applied to the terminals of the device increases the resistance decreases. In the birdge 122 the D.-C. control current passes through resistors 125 and 126 in series, and as this control voltage increases the resistance of elements 125 and 126 decreases. Therefore, as the D.-C. control signal from condenser 121 increases, the impedance of the bridge 122 between points 127 and 128 will decrease. Note that inasmuch as the impedance bridge 122 is always balanced for A.-C. signal no residual ripple from condenser 121 will appear at the terminals 127 and 128.

The bridge terminals 127 and 128 are connected in series with a resistor 129, and this series circuit is fed high frequency from an oscillator 130. The oscillator 130 has a frequency well above the frequencies usually found in seismic impulses. The frequency of oscillator 130 is preferably sufficiently high that the electronic components operating at its frequency may be small and light. A frequency of 500 cycles has been found satisfactory, but a higher frequency may be used. One side of the oscillator may be grounded if desired. The high frequency A.-C. signal appearing across resistor 129 is fed into an amplifier 131 preferably through coupling condenser 132 and grid resistor 133. The output of amplifier 131 is shown resistance coupled to a power amplifier 134, by means of plate resistor 135 coupling condenser 136, and load resistor 137 returning to ground as shown. It is apparent that amplifier 131 and its coupling elements plus amplifier 134 may be combined into a single amplifier if desired. The output from amplifier 134 is fed into a transformer 138 whose output is connected to full-wave rectifier 139 which delivers a pulsating D.-C. at its terminals 140 and 141. These pulsations are at the double frequency of oscillator 130, and because of the balance of bridge 122 there is present in the output of rectifier 139 no signal which represents the seismic frequency.

The output of rectifier 139 is passed through a smoothing filter comprising choke 142 and condensers 143 and 144. Because of the high frequency of pulsation of the output of rectifier 139 the filter elements 142, 143 and 144 may be quite small in size and weight and still give highly efficient smoothing action. The output of the filter is shown fed to equal resistors 145 and 146, each of which is paralleled with one of two equal condensers 147 and 148. The mid-point 150 of this circuit may be grounded and the output leads 151 deliver control voltage which may be used to control the seismograph channels. In the figure the terminals 151 are shown connected to the control terminals 4 of the AVC amplifier and similar terminals 153 are provided which are connected to the respective corresponding control terminals of the amplifying channels.

Whereas the output circuit is shown to be balanced to ground at 150, it is apparent that certain types of controls may not require this and in such event one of the terminals 151 may be grounded instead of the mid-point 150 of the AVC circuit. It is also apparent that the master AVC system shown will operate in conjunction with any type of D.-C. operated means for controlling the amplification of the separate amplifiers.

It is apparent that all elements of the system connected between the condenser 121 and the condenser 144 operate at high frequency and therefore may be made small and light. The oscillator 130 may be made very small and light by using a transistor. Furthermore, the various coupling condensers, and in fact all elements of the power amplifier 134 can be made highly efficient and at the same time very light in weight. It is also apparent that the output of the amplifying system 134 contains no residual of the seimsic frequency and therefore all tendency of the system to oscillate is eliminated.

Whereas, the master AVC has been described as operating in cascade with either of two particular types of individual AVC's described, it is contemplated that any known type of individual AVC may be employed which will operate on the channel signal subsequent to the point in the channel at which the master AVC voltage is applied. Also the individual AVC's described may be cascaded with any known type of master AVC.

The long and short time constants of the master AVC and individual AVC's respectively are the time constants of the respective circuits for release of control, this being the time constant of the circuit for release of its own energy without external influence. The attack time, i.e. the time that it takes for the circuit to take hold of control, depends on the magnitude of the input signal as well as on other factors.

The time constant of the master AVC is advantageously long as previously stated. By this is meant that its time constant is long as compared with the duration of a seismic impulse. Seismic impulses have a duration of from about .05 to 0.3 second and the master AVC's long time constant is preferably from 1.0 to 2.0 seconds. On the other hand, the individual AVC's have a short time constant, namely the instantaneous logarithmic AVC has a very low (substantially zero) time constant, whereas the fast-acting individual AVC has a time constant of from 0.5 to 0.3 second, which time constant is of the same order of magnitude as, and therefore consonant with, the duration of a seismic pulse.

By the use of this invention wherein a long time constant master AVC is succeeded in cascade by a short time constant individual AVC, it is possible to attain a much shorter time of attack than was heretofore possible, i.e. the amplifier is brought under control within a shorter time after receiving the strong first arrivals. This is because each AVC has only to effect a fractional part of the total control effect required to bring the amplifier output within range of the recording medium, the total control effect being the mathematical product of the two control effects. Thus, inasmuch as each control has a lesser control to establish, it reaches the controlled condition faster than it could if it were acting alone.

By way of example only and without limiting the invention in any way, the following table lists values which have been used for the various circuit components mentioned herein and not otherwise described.

| Component | Value |
| --- | --- |
| Transformer 2 | Imp. ratio 500/470,000 ohms. |
| Tube 3 | ½ type 6112. |
| Resistor 5 | 4.7 kilo-ohms. |
| Condenser 6 | 30 mfd. |
| Resistor 7 | 270 kilo-ohms. |
| Condenser 8 | .25 mfd. |
| Resistor 9 | 150 kilo-ohms. |
| Condenser 13 | .05 mfd. |
| Resistor 18 | 18 kilo-ohms. |
| Resistor 19 | 18 kilo-ohms. |
| Nonlinear resistor 22 | Thyrite cat. No. 8399401 G1. |
| Nonlinear resistor 23 | Do. |
| Condenser 24 | 10 mfd. |
| Condenser 25 | Do. |
| Resistor 26 | 82 kilo-ohms. |
| Tube 27 | ½ type 6112. |
| Resistor 28 | 1.5 megohms. |
| Resistor 29 | 6.8 kilo-ohms. |
| Condenser 30 | 20 mfd. |
| Resistor 31 | 470 kilo-ohms. |
| Resistor 32 | Do. |
| Condenser 33 | .25 mfd. |
| Resistor 34 | 150 kilo-ohms. |
| Nonlinear resistor 36 | Thyrite cat. No. 8399401 G1. |
| Nonlinear resistor 37 | Do. |
| Condenser 39 | 10 mfd. |
| Condenser 40 | Do. |
| Resistor 42 | 18 kilo-ohms. |
| Resistor 43 | Do. |
| Condenser 46 | .05 mfd. |
| Resistor 47 | 560 kilo-ohms. |
| Nonlinear resistor 48 | Thyrite cat. No. 8399401 G1. |
| Nonlinear resistor 49 | Do. |
| Condenser 50 | 1.75 mfd. |
| Condenser 53 | .01 mfd. |
| Tube 54 | ½ type 6112. |
| Resistor 56 | 12 kilo-ohms. |
| Resistor 57 | 2.2 megohms. |
| Tube 61 | Type 5840. |
| Resistor 62 | 470 kilo-ohms. |
| Resistor 63 | 2.2 megohms. |
| Resistor 64 | 1.5 kilo-ohms. |
| Resistor 65 | 2.2 megohms. |
| Condenser 66 | .25 mfd. |
| Condenser 67 | .05 mfd. |
| Resistor 69 | 1.2 megohms. |
| Nonlinear resistor 71 | Thyrite cat. No. 8399401 G1. |
| Nonlinear resistor 72 | Do. |
| Condenser 73 | 10 mfd. |
| Condenser 74 | Do. |
| Condenser 81 | .05 mfd. |
| Tube 82 | ½ type 6112. |
| Resistor 83 | 1.5 megohms. |
| Resistor 84 | 3.3 kilo-ohms. |
| Condenser 85 | 30 mfd. |
| Condenser 86 | 30 mfd. |
| Resistor 87 | 270 kilo-ohms. |
| Condenser 88 | .25 mfd. |
| Transformer 89 | Imp. ratio 60,000/20 ohms. |
| Condenser 91 | .05 mfd. |
| Resistor 92 | 2.2 megohms |
| Tube 93 | Type 5719. |
| Resistor 94 | 10 megohms. |
| Resistor 95 | 1.5 megohms. |
| Nonlinear resistor 96 | Thyrite cat. No. 8399401 G1. |
| Resistor 97 | 3.9 kilo-ohms. |
| Condenser 98 | 30 mfd. |
| Resistor 99 | 330 kilo-ohms. |
| Condenser 100 | .25 mfd. |
| Transformer 101 | Imp. ratio 60,000/10,000 ohms. |
| Rectifier (fw) 102 | 4 type 1N100. |
| Condenser 105 | 3.5 mfd. |
| Resistor 106 | 15 kilo-ohms. |
| Nonlinear resistor 107 | Thyrite cat. No. 8399401 G1. |
| Nonlinear resistor 108 | Do. |
| Resistor 112 | 39 kilo-ohms. |
| Resistor 113 | 470 kilo-ohms. |
| Transformer 114 | Imp. ratio 500/470,000 ohms. |

| Component | Value |
| --- | --- |
| Transformer 118 | Imp. ratio 60,000/10,000 ohms. |
| Rectifier (fw) 119 | 4 type 1N100. |
| Resistor 120 | 2.2 kilo-ohms. |
| Condenser 121 | 20 mfd. |
| Condenser 123 | .05 mfd. |
| Condenser 124 | Do. |
| Nonlinear resistor 125 | Thyrite cat. No. 8399401 G1. |
| Nonlinear resistor 126 | Do. |
| Resistor 129 | 10 kilo-ohms. |
| Condenser 132 | 0.1 mfd. |
| Resistor 133 | 1.5 megohms. |
| Resistor 135 | 210 kilo-ohms. |
| Condenser 136 | .25 mfd. |
| Resistor 137 | 68 kilo-ohms. |
| Transformer 138 | Imp. ratio 10,000/1000 ohms. |
| Rectifier (fw) 139 | 200 v., 50 milliamp., f-w type. |
| Choke 142 | 7 henrys. |
| Condenser 143 | 5 mfd. |
| Condenser 144 | Do. |
| Resistor 145 | 2700 ohms. |
| Resistor 146 | Do. |
| Condenser 147 | 2 mfd. |
| Condenser 148 | Do. |

What I claim as my invention is:

1. A multi-channel seismograph AVC system comprising a plurality of amplifiers adapted to amplify seismic signals and having at least two elements adapted to control the amplification thereof, a master D.-C. voltage-generating means connected to one of said amplifiers for converting energy from said amplifier to a D.-C. control voltage whose magnitude increases with an increase of signal of said amplifier, filter means connected to said voltage-generating means having a relatively long time constant with respect to the duration of a seismic pulse, means connecting the output of said long-time-constant filter means to corresponding control elements of a plurality of amplifiers, individual D.-C. voltage-generation means connected to respective amplifiers for converting energy of the respective amplifier to a D.-C. control voltage whose magnitude increases with an increase of the signal of the respective amplifier, filter means connected respectively to said individual D.-C. voltage-generating means having a relatively short time constant that is consonant with the duration of a seismic pulse, and means respectively connecting the output of said short-time-constant filter means to a different corresponding control element of the respective amplifiers.

2. A multi-channel seismograph AVC system comprising a plurality of amplifiers adapted to amplify seismic signals and having first and second cascaded elements adapted to control the amplification thereof, a master D.-C. voltage-generating means connected to one of said amplifiers for converting energy from said amplifier to a D.-C. control voltage whose magnitude increases with an increase of signal of said amplifier, filter means connected to said voltage-generating means having a relatively long time constant with respect to the duration of a seismic pulse, means connecting the output of said long-time-constant filter means to corresponding first control elements of a plurality of amplifiers, individual D.-C. voltage-generating means respectively connected to the respective amplifiers at a point in its circuit subsequent to the first control element thereof for converting energy of the respective amplifier to a D.-C. control voltage whose magnitude increases with an increase of signal of the respective amplifier, filter means connected respectively to said individual D.-C. voltage-generating means having a relatively short time constant that is consonant with the duration of a seismic pulse, and means respectively connecting the output of said short-time-constant filter means to the second corresponding control element of the respective amplifiers.

3. A multi-channel seismograph AVC system comprising a plurality of amplifiers adapted to amplify seismic signals and having first and second cascaded elements aadpted to control the amplification thereof, a master D.-C. voltage-generating means connected to one of said amplifiers for converting output energy from said amplifier to a D.-C. control voltage whose magnitude increases with an increase of output signal of said amplifier, filter means connected to said voltage-generating means having a relatively long time constant with respect to the duration of a seismic pulse, means connecting the output of said long-time-constant filter means to corresponding first control elements of a plurality of amplifiers, individual D.-C. voltage-generating means respectively connected to the respective amplifiers at a point between said first and second control elements for converting signal of the respective amplifier to a D.-C. control voltage whose magnitude increases with an increase of the signal of the respective amplifier at said point, filter means connected respectively to said individual D.-C. voltage-generating means having a relatively short time constant that is consonant with the duration of a seismic pulse, and means respectively connecting the output of said short-time-constant filter means to the second corresponding control element of the respective amplifiers.

4. A multi-channel seismograph AVC system comprising a master AVC amplifier having an element adapted to control the amplification thereof and a plurality of amplifiers adapted to amplify seismic signals and having first and second cascaded elements adapted to control the amplification thereof, a master D.-C. voltage-generating means connected to said master AVC amplifier for converting energy from said amplifier to a D.-C. control voltage whose magnitude increases with an increase of signal of said AVC amplifier, filter means connected to said voltage-generating means having a relatively long time constant with respect to the duration of a seismic pulse, means connecting the output of said long-time-constant filter means to corresponding first control elements of a plurality of amplifiers, means connecting the output of said long-time-constant filter means to the control element of said AVC amplifier, individual D.-C. voltage-generating means connected to respective amplifiers for converting energy of its respective amplifier to a D.-C. control voltage whose magnitude increases with an increase of the signal of the respective amplifier, filter means connected respectively to said individual D.-C. voltage-generating means having a relatively short time constant that is consonant with the duration of a seismic pulse, and means respectively connecting the output of said short-time-constant filter means to the second corresponding control elements of the respective amplifiers.

5. A multi-channel seismograph AVC system comprising a plurality of amplifiers adapted to amplify seismic signals and having an element adapted to control the amplification thereof, voltage-generating means connected to one of said amplifiers for converting energy from said amplifier to a control voltage whose magnitude increases with an increase of signal of said amplifier, means connecting the output of said voltage-generating means to corresponding control elements of a plurality of amplifiers including said one to which said voltage-generating means is connected, and means connected respectively to the output stage of a plurality of said amplifiers controlling the output signal in proportion to the logarithm of the signal to the output stage of the respective amplifier.

6. A multi-channel seismograph AVC system comprising a plurality of amplifiers adapted to amplify seismic signals and having an element adapted to control the amplification thereof, D.-C. voltage-generating means connected to one of said amplifiers for converting energy from said amplifier to a D.-C. control voltage whose magnitude increases with an increase of signal of said amplifier, filter means connected to said voltage-generating means having a relatively long time constant with respect to the duration of a seismic pulse, means connecting the D.-C. output of said long-time-constant filter means to corresponding control elements of a plurality of amplifiers including said one to which said voltage-generating means is connected, and means connected respectively to the output stage of a plurality of said amplifiers excepting said one to which said voltage-generating means is connected controlling the output signal in proportion to the logarithm of the signal to the output stage of the respective amplifier.

7. A multi-channel seismograph AVC system comprising a plurality of amplifiers adapted to amplify seismic signals and having an element adapted to control the amplification thereof, D.-C. voltage-generating means connected to one of said amplifiers for converting energy from said amplifier to a D.-C. control voltage whose magnitude increases with an increase of signal of said amplifier, filter means connected to said voltage-generating means having a relatively long time constant with respect to the duration of a seismic pulse, means connecting the D.-C. output of said long-time-constant filter means to corresponding control elements of a plurality of amplifiers including said one to which said voltage-generating means is connected, and means connected respectively to the output stage of a plurality of said amplifiers excepting said one to which said voltage-generating means is connected comprising in each instance a fixed resistor having one terminal connected to the ground circuit and its other terminal connected to the input circuit of the output stage of the amplifier, a nonlinear voltage-sensitive resistor whose resistance decreases with an increase of applied voltage having one terminal connected to the input circuit of said output stage and its other terminal connected to the output circuit of said output stage.

8. A seismograph AVC system comprising a seismograph amplifying channel, means for sampling the signal of the amplifying channel, means for rectifying and smoothing said signal, a balanced impedance bridge comprising two series-connected similar nonlinear voltage-sensitive resistors connected in parallel with two series-connected similar impedance elements connected to said smoothing means, an oscillator producing a signal of a frequency substantially higher than seismic frequency, a fixed resistor having one terminal connected to the junction of said voltage-sensitive resistors, means connecting said oscillator to the junction of said impedance elements and to the free terminal of said fixed resistor, amplifying means connected to said fixed resistor adapted to amplify the high frequency signal across said fixed resistor, means connected to said amplifying means for rectifying and smoothing the output of said amplifying means, and means for connecting said last-named smoothing means to the control elements of the amplifying channel.

9. A seismograph AVC system comprising a seismograph amplifying channel, means for sampling the signal of the amplifying channel, means for rectifying and smoothing said signal, a balanced impedance bridge comprising two series-connected similar nonlinear voltage-sensitive resistors connected in parallel with two series-connected similar condensers connected to said smoothing means, an oscillator producing a signal of a frequency substantially higher than seismic frequency, a fixed resistor having one terminal connected to the junction of said voltage-sensitive resistors, means connecting said oscillator to the junction of said condensers and to the free terminal of said fixed resistor, amplifying means connected to said fixed resistor adapted to amplify the high frequency signal across said fixed resistor, means connected to said amplifying means for rectifying and smoothing the output of said amplifying means, and means for connecting said last-named smoothing means to the control elements of the amplifying channel.

10. A multi-channel seismograph AVC system comprising a master AVC amplifier having an element adapted to control the amplification thereof and a plurality of amplifiers adapted to amplify seismic signals and having first and second cascaded control elements adapted to control the amplification thereof, means for sampling the signal of said AVC amplifier, means for rectifying and smoothing said signal, a balanced impedance bridge comprising two series-connected similar nonlinear voltage-sensitive resistors connected in parallel with two series-connected similar impedance elements connected to said smoothing means, an oscillator producing a signal of a frequency substantially higher than seismic frequency, a fixed resistor having one terminal connected to the junction of said voltage-sensitive resistors, means connecting said oscillator to the junction of said impedance elements and to the free terminal of said fixed resistor, amplifying means connected to said fixed resistor adapted to amplify the high frequency signal across said fixed resistor, means connected to said amplifying means for rectifying and smoothing the output of said amplifying means, means for connecting said last named smoothing means to the control element of said AVC amplifier and to corresponding first control elements of a plurality of seismic amplifiers, individual AVC voltage-generating means connected to the respective seismic amplifiers at a point between said first and second control elements for converting signal of the respective amplifier to a control voltage, and means respectively connecting the output of said individual AVC voltage-generating means to the corresponding second control element of the respective amplifier.

11. A multi-channel seismograph AVC system comprising a plurality of amplifiers adapted to amplify seismic signals and having an element adapted to control the amplification thereof, means for sampling the signal of one of said amplifiers, means for rectifying and smoothing said signals, a balanced impedance bridge comprising two series-connected similar nonlinear voltage-sensitive resistors connected in parallel with two series-connected similar impedance elements connected to said smoothing means, an oscillator producing a signal of a frequency substantially higher than seismic frequency, a fixed resistor having one terminal connected to the junction of said voltage-sensitive resistors, means connecting said oscillator to the junction of said impedance elements and to the free terminal of said fixed resistor, amplifying means connected to said fixed resistor adapted to amplify the high frequency signal across said fixed resistor, means connected to said amplifying means for rectifying and smoothing the output of said amplifying means, and means for connecting said last named smoothing means to the control elements of a plurality of amplifiers including said one to which said first named rectifying and smoothing means is connected.

References Cited in the file of this patent

UNITED STATES PATENTS

| | | |
|---|---|---|
| 2,193,966 | Jones | Mar. 19, 1940 |
| 2,228,883 | Morgan | Jan. 14, 1941 |
| 2,237,407 | Bruck | Apr. 8, 1941 |
| 2,279,128 | Paslay | Apr. 7, 1942 |
| 2,286,106 | Ritzman | June 9, 1942 |
| 2,323,634 | Van Slooten et al. | July 6, 1943 |
| 2,431,306 | Chatterjea | Nov. 25, 1947 |
| 2,554,905 | Hawkins et al. | May 29, 1951 |
| 2,600,051 | Fay et al. | June 10, 1952 |
| 2,625,606 | Lakatos et al. | Jan. 13, 1953 |
| 2,723,387 | Slavin | Nov. 8, 1955 |
| 2,728,862 | Bourgknecht | Dec. 27, 1955 |